Figure 1:
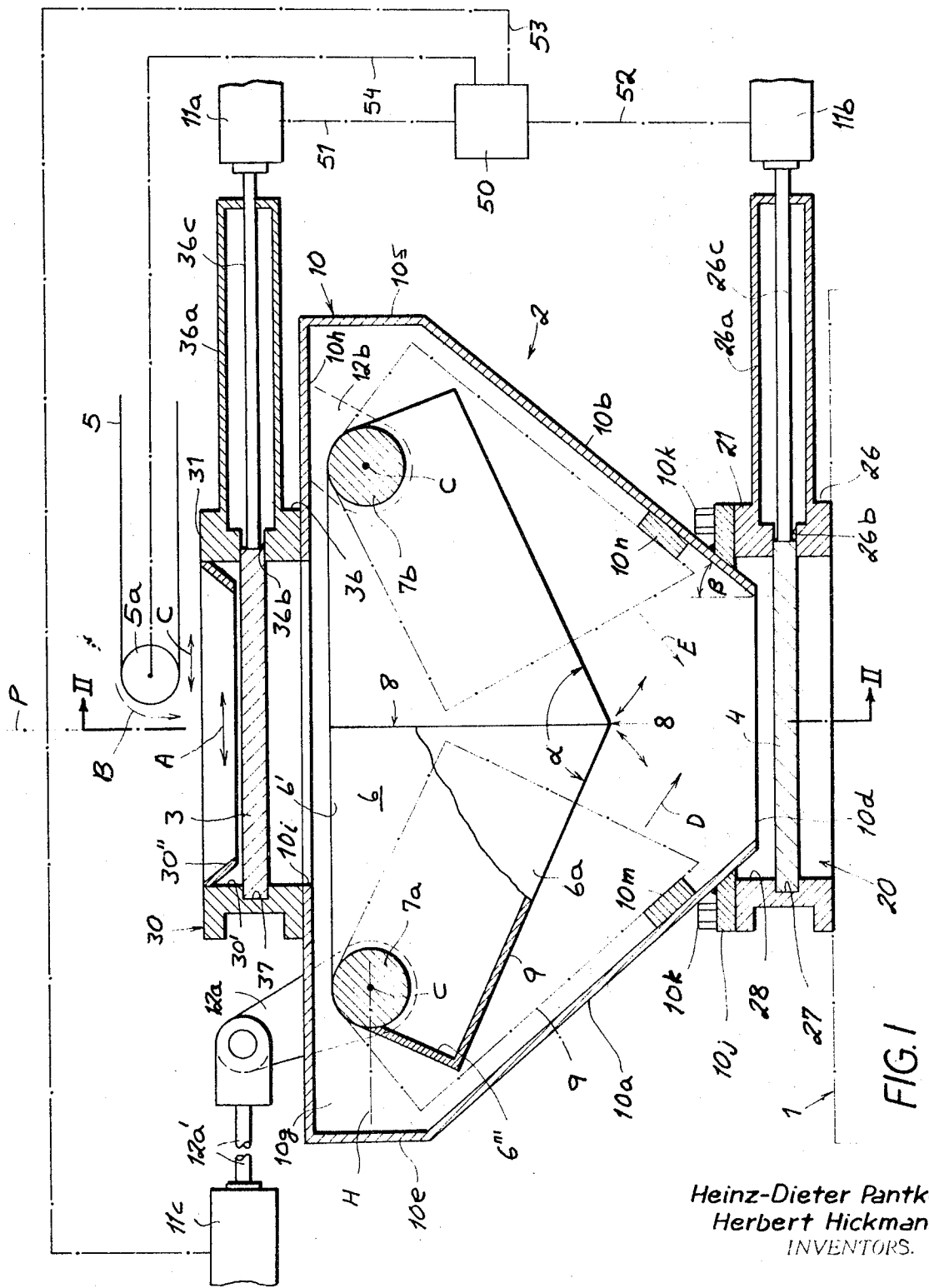

United States Patent

[11] 3,598,257

[72] Inventors Heinz-Dieter Pantke
Essen-Frintrop;
Herbert Hickmann, Oberhausen, both of, Germany
[21] Appl. No. 839,451
[22] Filed July 7, 1969
[45] Patented Aug. 10, 1971
[73] Assignee Huttenwerk Oberhausen A. G.
Oberhausen, Germany
[32] Priority July 10, 1968
[33] Germany
[31] P 17 58 637.7

[54] APPARATUS FOR CHARGING SHAFT-TYPE FURNACES
8 Claims, 2 Drawing Figs.

[52] U.S. Cl. .................................................. 214/35 R,
266/27
[51] Int. Cl. .................................................. F27b 1/20
[50] Field of Search .......................................... 214/18, 35;
266/27

[56] References Cited
UNITED STATES PATENTS
3,329,288  7/1967  Knight et al. ............... 214/35
3,511,390  5/1970  Pantke et al. ............... 214/35 X

*Primary Examiner*—Robert G. Sheridan
*Attorney*—Karl F. Ross

ABSTRACT: An apparatus for charging shaft-type furnaces in which a pair of gas-lock gates are provided in vertically spaced relationship at the top of the furnace and above the upper gate a conveyor or the like delivers green pellets of metal or for charging the furnace. Between the two gates, there is provided a clamshell charging arrangement having two halves together forming an upwardly open bucket and adapted to swing apart to release the pellets into the chamber. The device has a funnellike configuration with downwardly convergent walls against which the bottom walls of the bucket lie when the shell halves are swung apart.

Heinz-Dieter Pantke
Herbert Hickmann
INVENTORS.

BY
Karl J. Ross
Attorney

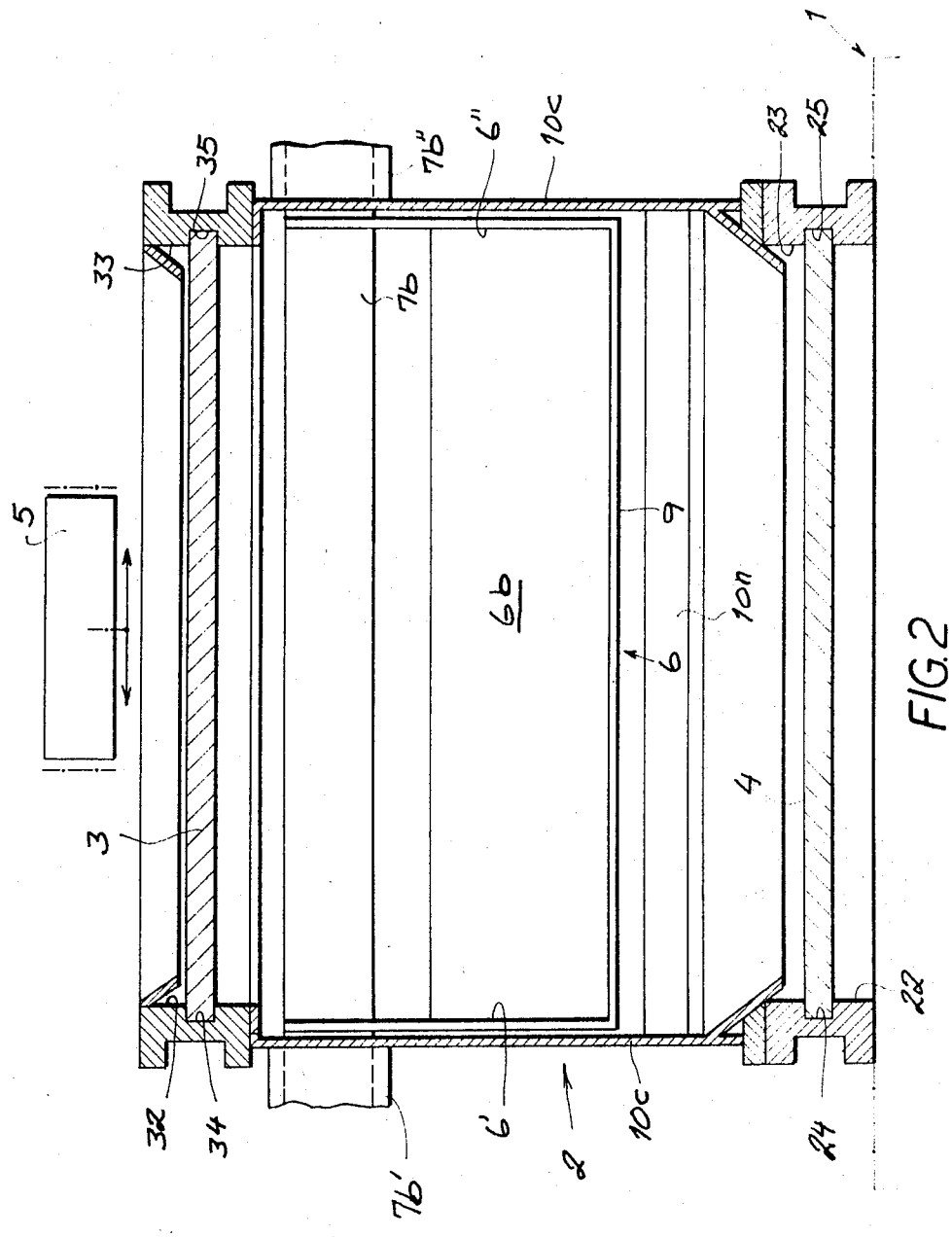

APPARATUS FOR CHARGING SHAFT-TYPE FURNACES

The present invention relates to an apparatus for charging shaft-type furnaces and, more particularly, to a charging apparatus particularly adapted to feed green pellets of metal ore into upright metallurgical (reducing) furnaces with a minimum of free fall.

Metallurgical reduction furnaces of the shaft or cupola type are increasingly employed at the present time for the reduction of metallurgical ores and especially the conversion of iron ore into sponge iron or an iron melt. Under the principles upon which use of such furnaces are based, a gradually descending charge or iron ore is subjected to a rising stream of a metallurgical reduction gas, especially a mixture of carbon monoxide and hydrogen, and converted to elemental iron which may be recovered with or without smelting. The iron oxide reacts with the reducing components of the gas to form the elemental iron as well as water vapor and carbon dioxide in a complex series of reactions which may differ from place to place along the upright charge depending upon temperature. In the design considerations of such furnaces, it is important to note that efficient operation requires a high throughflow of the gaseous phase and thus relatively high porosity of the charge, and yet sufficient charge density that the elemental iron will be produced at high rates. Since there is always a tendency toward segregation, channeling or piping in a porous columnar mass, i.e. a tendency of the gases to pass through channels formed in the mass to the exclusion of the remainder of the porous body, the danger exists that portions of the charge will remain unreacted while other portions are brought into intimate contact with excessive quantities of the reducing gas.

In practice, it has been found that proper distribution of the charge within the furnace and thus proper addition of increments of the charge are important for effective high-rate operation to yield high-purity metallurgical products.

To add increments of charge to such furnaces, it has heretofore been proposed to provide a gate arrangement or gas lock at the top of the furnace whereby, for example, a lower lock or gate is closed to block the escape of gases from the furnace while an upper lock or gate is opened to admit the charge, whereupon the upper gate is closed and the lower gate opened to permit the charge to cascade into the interior of the furnace and form a fresh layer upon the previously supplied charge bed therein.

To maintain the porosity of the charge column within the furnace, it has been found to be advantageous in the last few years to use pellets of the metallurgical ore as opposed to finely divided powders or irregular agglomerates or clumps.

More recently, it has been discovered that greater economy in terms of equipment, manpower and processing time can be realized when nonhardened or so-called "green" pellets are used in the charging of shaft-type furnaces of the character described.

However, such pellets are incapable of withstanding severe compressive forces, tend to break up with shock and are prone to deterioration by abrasive contact with surfaces and neighboring particles. When breakdown of the green pellets, which otherwise allow a substantial improvement in the production rate and efficiency of shaft-type furnaces, does occur, the fine particles from which the pellets were formed, are found to distribute themselves irregularly within the furnace to obstruct the uniform distribution of interstitial passages which must be maintained therein for uniform reactions at high rates. Experiments have shown that breakup occurs as a result of the fall of the green pellets from the charging system at the top of the furnace to the charge bed therebelow and by conventional handling of the pellets in the charging apparatus. The result of such deterioration of the pelletized charge is a nonuniform product containing substantial proportions of impurities, reduced furnace efficiency, etc.

It is, therefore, the principal object of the present invention to provide an improved apparatus for the charging of a shaft-type furnace, especially a metallurgical furnace adapted to operate with green pellets.

Another object of this invention is to provide a charging arrangement for such furnaces which avoids the disadvantages of earlier systems by substantially reducing deterioration of a pelletized charge.

Yet another object of the instant invention is to provide an improved apparatus of the general character described which extends principles originally set forth in the commonly owned application Ser. No. 711,102, filed 6 March 1968, (now U.S. Pat. No. 3,511,390), entitled "Apparatus for Charging Shaft-Type Furnaces," in which we participated.

In the aforementioned application, there is described an early phase of the work in developing a system for charging shaft-type furnaces in which deterioration of a pelletized charge could be avoided and stratification of the charge into fine and course particles is precluded.

In the system of that application, a conveyor means advanced to deposit particulate material in the charging apparatus which included a pair of closure members (upper and lower) adapted to bar the escape of gas and gas-entrained particles from the furnace. The dispensing device receiving the charge from the conveyor was located between the closure members and was constituted as a tiltable tray whose swinging axis extended parallel to the direction of movement of the conveyor. The latter was displaceable in the direction of this horizontal axis and cooperated with the tiltable tray to deposit a uniform layer of comminuted material in the furnace without the formation of a piling cone and with a substantially uniform thickness, with a minimum of deterioration of the pellets constituting the charge, and with insignificant segregation of large and small particles in the layer. The conveyor means was a band-type conveyor discontinuously operable in the cadence of swinging movement of the tiltable distributing tray while the closure members were swingable flaps or horizontally shiftable gates lying in planes perpendicular to the axis of the furnace above and below the tiltable tray.

In that application, the significance of using linearly slidable horizontal gates was described. These gates were displaceable between a chamber receiving the gate in the open condition thereof and a position in which the gate spans the mouth of the furnace. In fact, with a linear horizontal displacement of the platelike gates, which were slidably guided along their opposite lateral edges in recesses of a support frame surmounting the furnace while the forward edge of the gate (is the direction of "closing" displacement) was lodged in a similar recess at the far side of the frame, there appears to be no tendency toward deterioration of the sealing parts. The gates operated alternately in the cadence of displacement of the distributing tray.

Advantageously, a hydraulic or pneumatic system was provided in which the slidable gates were shifted by piston and cylinder arrangements whereas a further cylinder served to displace the tiltable tray via a bellcrank lever. This control system was found to be particularly satisfactory when a number of tiltable trays were used in tandem with reversible conveyors.

The tray of that application, which received a relatively thin layer of the comminuted material and deposited it within the furnace uniformly, maintains the material out of contact with the sealing surface of the closure members. This feature was found to be particularly desirable when a gas fed high-pressure shaft-type furnace was employed, inasmuch as leakage and pressure loss through the closure members was avoidable even with long periods of use. Thus the closure member served solely to seal the furnace and did not constitute part of the distributing means for the comminuted material. The system permitted a large number of relatively small thickness layers of the charge to be applied in succession to the bed within the furnace with ease and without danger to the charging apparatus, thereby avoiding separation or stratification and preventing the formation of regions of high and low porosity. The tray was displaced alternately from side to side to ensure the uniform distribution of the charge.

It has now been found to be possible to reduce deterioration of green pellets further by providing in a system of the general type described in connection with application Ser. No. 711,102, an intermediate collector for the green particles or pellets of the charge which consists of a clam shell-type bucket which is upwardly open to form a receptacle for the charge, even in the closed position of the bucket or shell halves. The bucket is composed, in accordance with an essential feature of the invention, of a pair of shell halves or bucket halves, symmetrically shaped and disposed with respect to a vertical plane through the charging apparatus, and swingable about respective horizontal axes to spread the shell halves apart to discharge the solid material into the furnace or toward one another to close the bottom of the bucket and temporarily retain the additional charge. The pivotal axes of the bucket halves extend parallel to one another in a common horizontal plane and are offset to opposite sides of the openings defined by the slidable closure members or gates located above and below this bucket.

According to a further feature of this invention, the bucket, in its closed position, is formed with downwardly converging floors upon which the charge is retained and which, upon opening of the bucket, lie parallel to the downwardly converging opposing walls of the funnel-shaped housing, in which the bucket is provided. At least at one point, each of the bucket halves rests against the corresponding wall in the open condition of the bucket.

This arrangement, which otherwise may be similar to that described in connection with the aforementioned copending application, sharply reduces the free fall height (e.g. by about one-half) between the charge-supplying conveyor and the charge bed within the furnace, thereby limiting deterioration of the charge during the feeding of the furnace. Furthermore, the movement of the charge along the floors of the bucket halves has been found to consist essentially of a rolling and/or sliding motion free from abrasive tendencies and leads to little deterioration of the charge, while ensuring an efficient mixing of the charge by the interaction of the streams of solid material sliding off both of the bucket halves.

The above and other objects, features and advantages of the present invention will become more readily apparent from the following description, reference being made to the accompanying drawing in which:

FIG. 1 is a vertical cross-sectional view, partly in diagrammatic form, of an apparatus for charging a shaft furnace in accordance with the present invention; and FIG. 2 is a cross-sectional view taken along the lines II-II of FIG. 1 showing the bucket in the closed condition.

In the drawing, the charging device 2 is adapted to surmount a vertically extending shaft-type cupola or blast furnace 1, especially a high-pressure shaft or columnar furnace for the treatment of comminuted metallurgical raw materials, e.g. pelletized upgraded metal ore or partially refined metal agglomerates.

The device generally comprises a hopper structure 10 having a pair of inwardly converging inclined walls 10a and 10b which, with vertical end walls 10c define a narrow mouth 10d just above the furnace 1. Above the inclined walls 10a, 10b, a pair of upright wall portions 10e and 10f are provided to define a rectangular upper compartment 10q closed by a plate 10h except for the rectangular mouth 10i in alignment with an opening 20 in the lower gas gate.

Above the mouth 10i of the hopper 10, there is provided the upper gas gate 30 which may be of the type described in application Ser. No. 711,102 and comprises a rectangular frame 31 of massive steel construction, in the sidewalls 32 and 33 of which are formed grooves 34 and 35 slidably receiving the longitudinal edges of a rectangular closure member 3 slidable as represented by the arrow A to block or unblock the opening 10i. The right-hand wall 36 of this frame is formed with a chamber 36a in line with a slot 36b through which the closure plate 3 is displaceable by a piston rod 36c such that the plate 3 may be wholly withdrawn into the chamber 36a and is protected from contamination therein during the introduction of green pellets into the furnace through the opening 30' in the frame 30. The actuating device is a fluid-responsive cylinder 11a. The opening 30' is defined at least in part by a downwardly converging funnel-shaped member 30'', which masks the grooves 34, 35 and 37 and the slot 36b to prevent contamination of the sealing surfaces of the closure member 3. Groove 37 receives the free end of plate 3 to complete the seal.

Above the frame 31 of lock 30, there is provided a conveyor arrangement 5 upon which the green pellets are conducted to the furnace and which may dump the green pellets over the front roller 5a of this conveyor as represented by the arrow B.

Below the hopper 10, there is provided the lower gate 20 which comprises a frame 21 similar to that described in connection with the upper gate and having longitudinal sidewalls 22 and 23 provided with inwardly facing guide channels 24 and 25 slidably receiving the lower closure plate 4. The free end of the latter is receivable in the frame wall 28 in a groove while the other short frame wall 26 is provided with a slot 26b through which member 4 may be withdrawn into a chamber 26a located outside the frame by the piston rod 26c. A fluid-responsive cylinder 11b is provided for this purpose. The hopper 10, whose mouth 10d lies inwardly of the frame walls to limit contamination of the sealing edges of the lower closure member, is welded to a ring 10j which, in turn, is affixed to the frame 21 by bolts 10k.

Within the hopper 10 and in accordance with the present invention, there is provided a clamshell-type bucket, generally designated at 6, having a rectangular opening 6' in the closed condition of the bucket which registers with the mouth 10i of the hopper and admits the green pellets into the bucket. The bucket halves 6a and 6b are generally trapezoidal in a vertical section corresponding to the plane of the paper of FIG. 1 and each has a downwardly inclined ramplike floor 9 meeting in an obtuse angle $\alpha$ of approximately 130°. The lateral walls, represented, for example, at 6' and 6'' for the bucket half 6b as seen in FIG. 2, are vertical and perpendicular to the axes C about which the buckets are adapted to pivot. An end wall is provided at 6'' as shown for the bucket 6a in FIG. 1 and extends at right angles to the ramp 9 of each bucket half. The bucket halves 6a and 6b are provided with mutually abutting edges 8, forming a closure seam when the bucket halves are brought together as shown for their solid line positions in FIG. 1, this edge being substantially rectangular. As is also apparent from FIG. 1, the bucket halves 6a and 6b are mirror symmetrical with respect to a vertical median through the device as represented at P in FIG. 1.

Each of the bucket halves 6a, 6b is fixed to a respective shaft 7a, 7b journaled in bearing blocks as shown at 7b' and 7b'' for the shaft 7b in FIG. 2, the bearing blocks being mounted on the end walls 10c of the hopper. Furthermore, the shafts each are formed with a bellcrank lever 12a and 12b actuable by a piston rod, e.g. as shown at 12a' in FIG. 1 via a fluid-responsive cylinder 11c, the corresponding cylinder of the bucket half 6b not being visible in the drawing.

Along the inner walls 10a and 1b of the hopper 10, there are provided abutment blocks 10m and 10n against which the sloping floors 9 of the bucket halves 6a and 6b are brought to rest when these bucket halves are permitted to swing downwardly (in the clockwise and counterclockwise sense for the bucket halves 6a and 6b, respectively), so that the floors 9 lie parallel to the walls 10a and 10b, preferably the walls 10a and 10b include an angle 2B with one another of about 80° or define angles B with the plane P of about 40°. The preferred angle of swing of each bucket half is thus about 25°.

As can also be seen from FIG. 1, the shafts 7a and 7b lie in a common horizontal plane H and are offset outwardly of the downward projection of the mouth 10i of the hopper 10. In addition, a control arrangement 50 can be provided for the cylinders and can be connected to cylinders 11a and 11b as represented by lines 51 and 52 and to the control cylinders for the bucket halves by a line 53.

To charge the furnace 1, in accordance with the present invention, gate 4 of the alternately operable gates 3, 4, remains closed to prevent an updraft of gases from the furnace 1, while gate 3 is open and the conveyor 5, operated by the controller 50 as represented by line 54, is actuated to deposit the green pellets with a relatively small drop into the closed bucket 6, the conveyor 5 having its discharge end shiftable as represented by arrow C to deposit the pellets uniformly in the bucket, thereby ensuring at least a thorough preliminary mixing of the charge. The system enabling movement of the conveyor 5 is described in application Ser. No. 711,102. The gate 3, during this period received in the chamber 36a, is shifted to the left to close the upper opening, while gate 4 is retracted into chamber 26a, thereby connecting the interior of the hopper 10 with the shaft furnace. The control 50 relieves the pressure in the bucket cylinders 11c, etc. and the bucket halves 6a, 6b swing downwardly to permit the fresh charge to slide downwardly along the ramplike floors to enter the furnace as represented by the arrows D and E. The inward movement of the charge ensures that, over the remaining relatively small drop, the charge will mix thoroughly and ensure the formation of a uniform layer on the charge bed within the furnace without separation into small and large particles. As can be seen from FIG. 1, it is preferred to make use of relatively massive shafts 7a, 7b so that they will be able to withstand the elevated temperatures, e.g. up to about 200° C. experienced in the charging apparatus, without distortion.

The improvement described and illustrated is believed to admit of many modifications within the ability of persons skilled in the art, all such modifications being considered within the spirit and scope of the invention except as limited by the appended claims.

We claim:

1. An apparatus for charging a shaft-type furnace, comprising:
   a housing surmounting said surface;
   an upper and lower gate along upper and lower portions of said housing and alternately operable to permit communication between the said housing and said furnace and between the exterior and said housing, each of said gates being formed with a respective opening in a horizontal plane, said openings registering with one another, and with respective plates slidable in said planes for selectively unblocking and blocking said openings;
   a bucket received in said housing between said gates and including a pair of bucket halves swingably mounted in said housing for receiving a charge introduced into said housing through the upper gate in a closed condition of said bucket wherein said bucket halves are swung together and for discharging the charge into said furnace through said lower gate upon the swinging of said bucket halves apart; and
   a pair of shafts extending parallel horizontally below the upper gate and outwardly of the boundaries of the opening thereof and swingably carrying said bucket halves, said bucket halves having respective downwardly converging floors in the closed condition of the bucket and lower edges spreading substantially the full width of said openings in an open condition of the bucket.

2. The apparatus defined in claim 1 wherein said bucket is of clamshell configuration and said bucket halves are mirror symmetrical about a vertical plane parallel to the swing axes of said bucket halves and have downwardly and inwardly inclined ramplike floors including an obtuse angle in the closed condition of said bucket, said shafts spanning said housing and being journaled in opposite walls thereof along the respective swing axis and rigidly affixed to said bucket halves, said apparatus including means external of said housing for swinging said shafts.

3. The apparatus defined in claim 2 wherein said housing is provided with an upper opening below said upper gate and a lower opening aligned with said upper housing opening and above said upper gate, and a pair of downwardly converging walls mirror symmetrically disposed on opposite sides of said vertical plane and terminating at said lower housing opening.

4. An apparatus for charging a shaft-type furnace, comprising:
   a housing surmounting said furnace;
   an upper and lower gate along upper and lower portions of said housing and alternately operable to permit communication between the said housing and said furnace and between the exterior and said housing;
   a bucket received in said housing between said gates and including a pair of bucket halves swingably mounted in said housing for receiving a charge introduced into said housing through the upper gate in a closed condition of said bucket wherein said bucket halves are swung together and for discharging the charge into said furnace through said lower gate upon the swinging of said bucket halves apart, said bucket being of clamshell configuration and said bucket halves being mirror symmetrical about a vertical plane parallel to the swing axes of said bucket halves and having downwardly and inwardly inclined ramplike floors including an obtuse angle in the closed condition of said bucket;
   a pair of massive shafts spanning said housing and journaled in opposite walls thereof along the respective swing axis and rigidly affixed to said bucket halves; and
   means external of said housing for swinging said shafts, said housing being provided with an upper opening below said upper gate and a lower opening aligned with said upper opening and above said upper gate, and a pair of downwardly converging walls mirror symmetrically disposed on opposite sides of said vertical plane and terminating at said lower opening, said shafts being offset outwardly of the projections of said opening, each of said bucket halves having a pair of generally trapezoidal vertical end walls, said end walls and said floor defining an abutment edge engageable with the abutment each of the other bucket half in a substantially rectangular seam, said walls including between them an acute angle and being provided with means engageable with said floors in the swung apart positions of said bucket halves, said floors lying parallel to said walls in said swung apart positions.

5. The apparatus defined in claim 4 wherein said upper and lower gates each include a frame aligned with the respective opening of said housing and formed with a pair of confronting guide channels, a closure plate slidably received in said frame and guided in said channels, and alternately operable fluid-responsive cylinders connected with said plates for actuating same.

6. The apparatus defined in claim 5 wherein each of said frames is formed with a chamber receiving the respective plate in a retracted position thereof.

7. The apparatus defined in claim 6, further comprising conveyor means above said upper gate for delivering metallurgical pellets to said bucket through said upper gate in a retracted position of the corresponding plate.

8. The apparatus defined in claim 4 wherein said housing is generally funnel-shaped, said floors lying along respective walls of said housing when said bucket halves are swung apart.